US006441997B1

(12) United States Patent
Blum (10) Patent No.: US 6,441,997 B1
(45) Date of Patent: *Aug. 27, 2002

(54) ANTI-RATTLE MECHANISM FOR CARTRIDGE (75) Inventor: James Blum, San Jose, CA (US)

(73) Assignee: Iomega Corporation, Roy, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/655,553

(22) Filed: Sep. 6, 2000

Related U.S. Application Data (63) Continuation of application No. 09/139,608, filed on Aug. 25, 1998, now Pat. No. 6,141,185.

(51) Int. Cl.[7] .............................................. G11B 23/03
(52) U.S. Cl. ...................................... 360/133; 369/291
(58) Field of Search ........................... 360/133; 369/291

(56) References Cited

U.S. PATENT DOCUMENTS

| 4,320,430 A | | 3/1982 | Vogt ............................. 360/133 |
| 4,394,700 A | * | 7/1983 | Edwards ....................... 360/133 |
| 4,400,748 A | | 8/1983 | Bauck et al. .................. 360/99 |
| 4,532,564 A | | 7/1985 | Larson et al. ................. 360/97 |
| 4,539,614 A | * | 9/1985 | Thompson ................. 360/99.02 |
| 4,559,575 A | | 12/1985 | Noto et al. .................. 360/133 |
| 4,604,664 A | | 8/1986 | Barski ........................... 360/97 |
| 4,608,617 A | | 8/1986 | Oishi et al. .................. 360/133 |
| 4,688,127 A | | 8/1987 | Oishi et al. .................. 360/132 |
| 4,864,452 A | | 9/1989 | Thompson et al. .......... 360/133 |
| 4,879,621 A | | 11/1989 | Chamberlin et al. ........ 360/133 |
| 4,901,173 A | | 2/1990 | Jones et al. ................. 360/99.04 |
| 4,943,880 A | | 7/1990 | Muehlhausen et al. ...... 360/133 |
| 5,299,186 A | | 3/1994 | Tsurushima .................. 369/291 |
| 5,444,586 A | | 8/1995 | Iftikar et al. ................ 360/99.12 |
| 5,475,674 A | * | 12/1995 | Yamashita et al. .......... 369/291 |
| 5,650,899 A | | 7/1997 | Schick et al. ............... 360/133 |
| 5,862,026 A | * | 1/1999 | Schick et al. ............... 360/133 |
| 5,907,533 A | | 5/1999 | Choi .......................... 369/271 |
| 5,912,786 A | * | 6/1999 | Nicklos et al. ........... 360/99.09 |
| 6,141,185 A | * | 10/2000 | Blum ......................... 360/133 |

FOREIGN PATENT DOCUMENTS

| EP | 369 651 | 5/1990 |
| JP | 59-8173 | 7/1984 |
| JP | 62-298980 | 12/1987 |
| JP | 01-019572 | 1/1989 |
| WO | WO 89/08312 | 9/1989 |

OTHER PUBLICATIONS

TDB, "Disk release mechanism for magnetic disk cartridge," *IBM Techn. Disclosure Bulletin*, 1979, 2499–2500.

* cited by examiner

Primary Examiner—Brian E. Miller
(74) Attorney, Agent, or Firm—Woodcock Washburn LLP (57) ABSTRACT A cartridge for a magnetic disk drive having a clamping mechanism which is actuated as the door to the cartridge is closed is disclosed. The cartridge is closed when he cartridge is removed from the drive. The door covers the opening through which the cartridge is accessed by read/write heads. When the cartridge is removed from the drive, the mechanism of the present invention clamps the recording disk against the cartridge shell to prevent rattle, which might otherwise damage the recording disk. The mechanism includes a rotating cam having helical lobes, a translating cam having helical slots to receive the lobes, a spring to bias the door and a spring to bias the rotating cam.

25 Claims, 12 Drawing Sheets

ANTI-RATTLE MECHANISM FOR CARTRIDGE

This Application is a continuation of U.S. provisional Application Ser. No. 09/139,608 filed Aug. 25, 1998 (Iom-9470) now U.S. Pat. No. 6,141,185.

FIELD OF THE INVENTION

This invention relates to data recording drives and, more particularly, to a removable cartridge for disk drives that contains a mechanism that restrains the cartridge disk/hub assembly when the cartridge is not in use.

BACKGROUND OF THE INVENTION

Magnetic disk drives which write and read digital data from flexible magnetic disks are wide spread. "Floppy disk drives" have been extensively used for small, so-called microcomputer systems, for word processing applications and the like. The flexible disk cartridge includes a relatively thin, flexible jacket which is inserted into the floppy disk drive.

Rigid disk drives, such as the Model 3350 produced by IBM Corporation, usually have a fixed rigid magnetic media. The magnetic heads do not contact the magnetic surface, but ride on a thin film of air. Because of this, and other features, these disk drives are capable of extremely precise and high speed operation. This type of disk drive is commonly referred to as a "Winchester" drive.

"Bernoulli" disk drives having performance characteristics similar to that of Winchester drives, but with removable cartridges, have been developed. A flexible magnetic disk is enclosed in a rigid box which is normally completely closed. U.S. Pat. No. 4,400,748 to Bauck et al. and related patents that are assigned to the assignee of the present invention describe drives using Bernoulli flexible disks. U.S. Pat. No. 4,901,173 to Jones et al. Also, related patents that are assigned to the assignee of the present invention describe improvements which relate to so-called "half height drives."

Rigid disks enclosed in a rigid, removable cartridge, or shell have also been used. U.S. Pat. No. 4,864,452 to Thompson et al. is an example of such a drive.

The JAZ™ drive that is manufactured and sold by the assignee of the present invention, like a Winchester type drive, stores data on rigid recording media.

Removable cartridges that are used with such drives typically have a door which closes the cartridge when it is removed from the drive. The door prevents contamination on the magnetic recording medium when the cartridge is not in the drive. When the cartridge is inserted into the drive, the door slides to an open position to provide access for the magnetic recording heads to engage the recording medium.

When the cartridge is removed from the drive, it is often subject to rough handling. During handling, physical contact of the disk with the shell may damage the disk, particularly if the disk and cartridge shell are subject to excessive "rattling".

U.S. Pat. No. 5,650,899 to Schick ('899" patent), which is assigned to the assignee of the present invention and incorporated herein by reference in its entirety, shows a non-rattling mechanism for removable cartridges. The cartridge shown in the '899 patent, which is used with a magnetic disk drive, has a clamping mechanism that is actuated as the door to the cartridge is opened and closed. When the door closes, the mechanism clamps the recording medium against the cartridge shell to prevent the disc from rattling inside the housing, which might otherwise damage the recording disk. When the door opens, the mechanism retracts to free the disk to rotate.

Typically, the door of the '899 patent cartridge was not self-closing, but rather required a mechanical mechanism within the drive to physically close the door. If the mechanical closing mechanism did not close the door, or if a user opened the door by hand outside of the drive, then the disk is exposed to contaminants.

It is an object of the present invention to provide a device which clamps the disk to the cartridge shell when the cartridge is removed from the drive to prevent rattling of the cartridge, which has sufficient strength to close the cartridge door, and which is easy to assemble.

SUMMARY OF THE INVENTION

In accordance with the present invention, a clamping mechanism in a data storage cartridge is actuated when the cartridge is removed from the drive. The mechanism restrains the recording medium to prevent rattling.

The clamping mechanism is driven by the motion of the sliding door. When the door is in a closed position (which corresponds to the cartridge disposed out of the drive) the mechanism expands or extends to restrain the media from rattling inside the cartridge during handling. When the door is in an opened position (which corresponds to the cartridge disposed inside of the drive) the mechanism contracts such that it is free of the hub and the media is free to rotate.

The clamping mechanism includes a rotating cam which rotates in around same axis as the media, a translating cam follower, a door spring, a rotating cam spring, and an arm, which connects the rotating cam to the motion of the sliding cartridge door. The mechanism is mounted on a post in the cartridge top shell half. The clamping mechanism is situated in the cavity formed inside the media hub. The door spring is a torsion spring that is disposed around the post. The door spring has sufficient strength to pivot the door to its fully closed position. The rotating cam spring, which is also disposed around the post, provides torsion to pivot the rotating cam to its clamped state, also referred to herein as its rest state or locked state, that exists while the door is fully closed. The rotating cam has spiral radial lobes that cooperate with spiral slots in the translating member. A rotating cam spring urges the cam actuation.

The mechanism is attached to the sliding door by means of a bent wire which slides in a slot in the end of an arm which pivots about the axis of the recording media. In a preferred embodiment, a member, which is rotatable about the axis of the recording medium, has an arm connected to the door and attaches the sliding door to the mechanism. A wire in an opening in the terminal end of the arm telescopes into and out of the opening as the door travels through its stroke. This provides compliance to account for relative changes in the distance between the mechanism and sliding door attachment point as the door travels through its stroke. A door spring actuates the door via the bent wire.

The mechanism has two states; locked and unlocked, which correspond respectively to the door closed and door opened states. In the locked state, the translating cam follower applies a force against the media hub effectively trapping the hub against the cartridge bottom shell. This force is sufficient to prevent the media from rattling against the cartridge shell halves when out of the drive. In the unlocked state, the translating cam does not contact the hub to allow the media to spin freely when coupled to a spindle motor.

The foregoing and other objects, features and advantages of the invention will be better understood from the following more detailed description and appended claims.

BRIEF DESCRIPTION OF THE DRAWINGS

The accompanying drawings which are incorporated in and constitute a part of the specification, illustrate the preferred embodiment of the invention and together with the description, explain the principles of the invention. The invention will now be further described by way of example, with reference to the accompanying drawings, in which.

DETAILED DESCRIPTION OF THE PREFERRED EMBODIMENT

Figure 1:
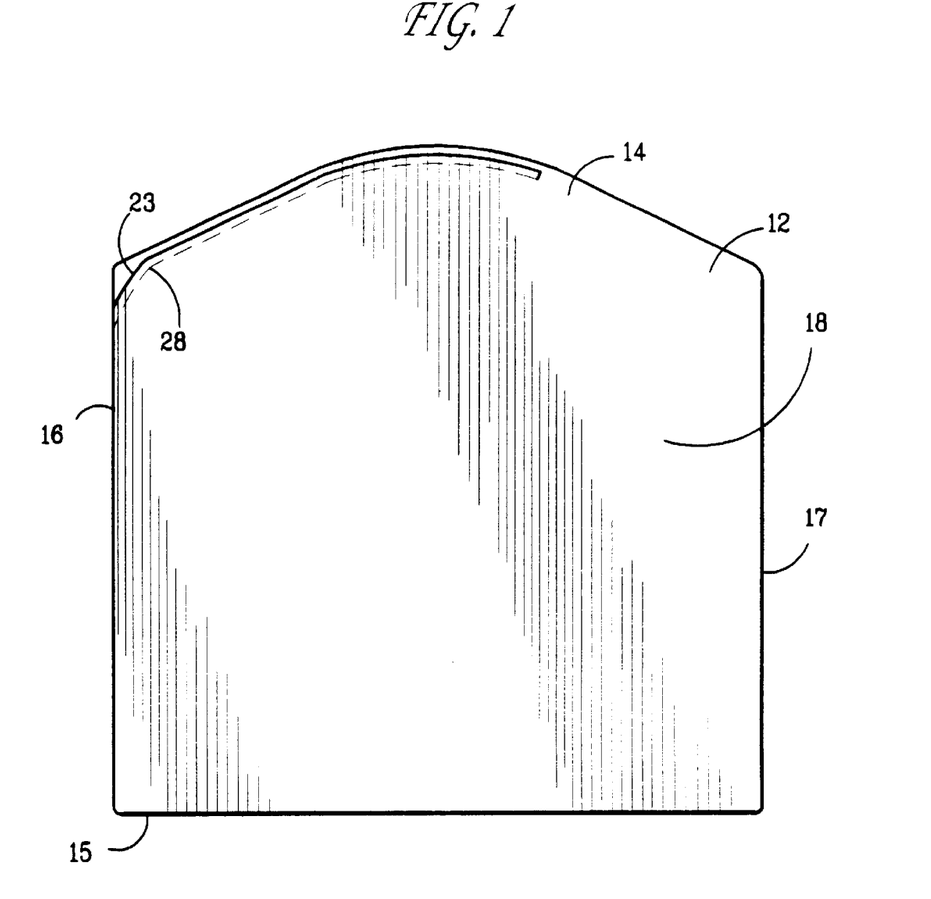
FIG. 1 shows a top view of the cartridge.
Figure 2:
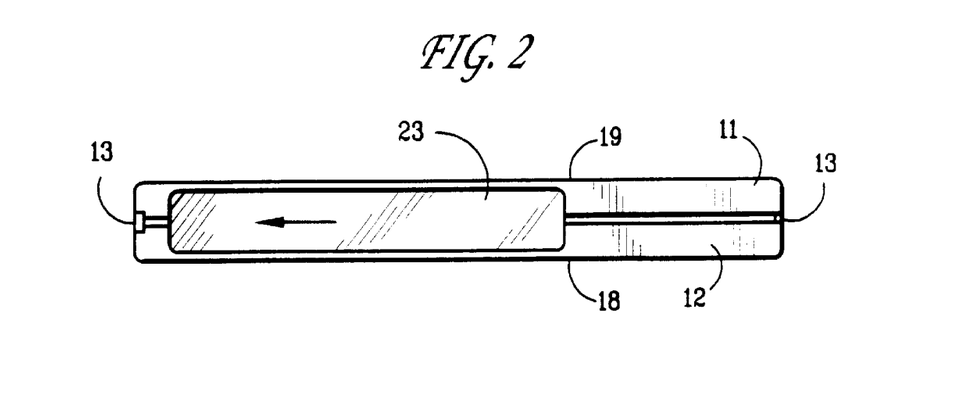
FIG. 2 shows a front view of the cartridge with the door closed.
Figure 3:
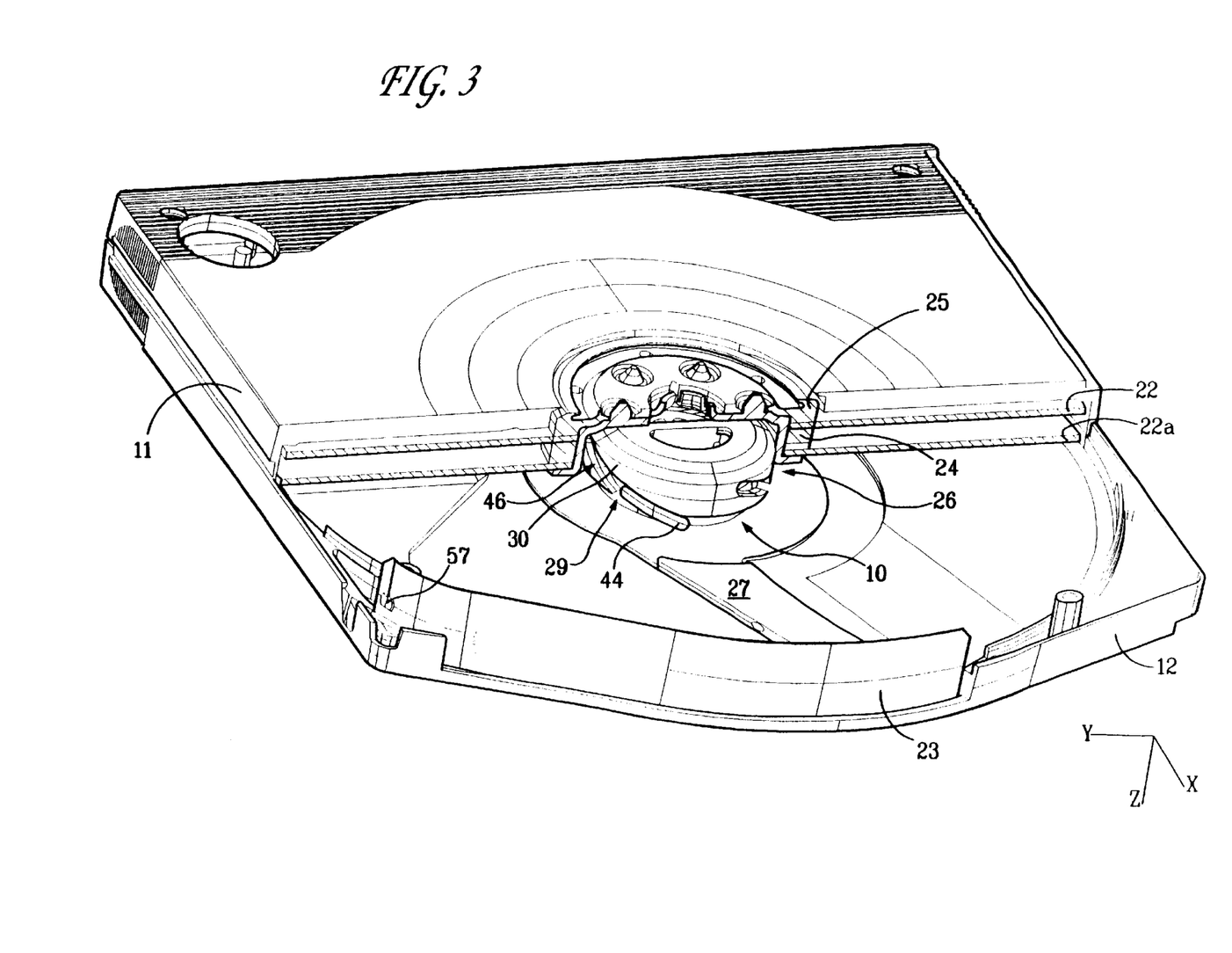
FIG. 3 is a bottom perspective view with a portion of the bottom shell and recording media removed to show the cams.

FIGS. 1–3 show a cartridge having two half shells 11 and 12 joined together at joint 13. The cartridge has a front 14, a back 15 and two sides 16 and 17 between substantially flat planar surfaces 18 and 19. An opening 20 in the front of the cartridge provides access by the read/write heads to the recording disks 22, 22a.

As best shown in FIG. 1, the cartridge has a protruding front 14 that preferably comprises substantially rectilinear portions that obliquely extend from sides 16 and 17, and that yield to a radius portion near the center of front 14. Pack 15, sides 19 and 17, and surfaces 18 & 19 otherwise preferably form an approximate right parallelpiped.

The disks 22 and 22a, a spacer 24, a spindle hub 26, and a bottom plate 25 comprise the media hub. A flexible door 23 covers the opening 20 (shown in FIG. 5) when the cartridge is removed from the drive. A hole in the bottom shell half allows access for a spindle motor to engage the bottom plate 25 of the media hub. Door arm 27, which is attached to door 23, is shown in the closed position in FIG. 3.

Figure 10:
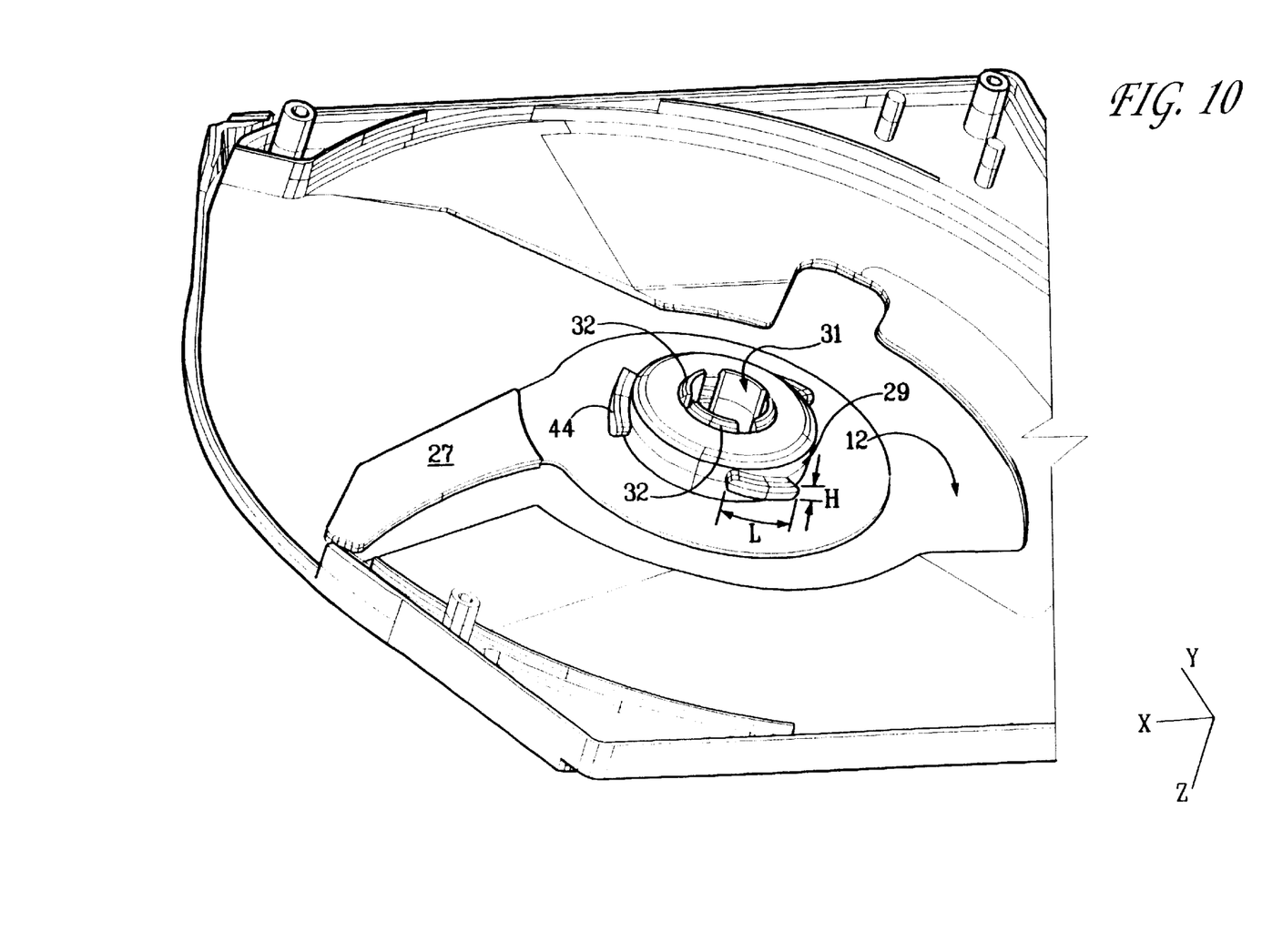
FIG. 10 is a perspective view of the top shell including the rotating cam.

The clamping mechanism 10 according to the present invention is actuated as the door 23 is opened and closed. The mechanism 10 includes a rotating cam 29 with three helical lobes 44, and a translating cam 30 with three matching helical slots 46. As best seen in FIGS. 1 and 10, each lobe 44 has an arcuate or spiral length "L" that is substantially greater than its longitudinal height "H". The greater contact surface area created by such lobe shape, compared with prior art designs having cylindrical posts of diameter H, provides operational and manufacturing advantages. The terms "helical," and "spiral" (and variations thereof) in this application and appended claims may refer to a curved shape (that is, wherein the lobe has a somewhat cup-like shape), a helical shape, or a straight shape obliquely oriented to the longitudinal axis (that is, wherein the lobes have a substantially constant slope). As used in the specification and appended claims, the terms "translating cam" and "translating cam follower" are synonymous. Both cams 29 and 30 are located coaxial to the media hub. Translating cam 30 is moved axially by the cam lobes 44 as the rotating cam 29 rotates. This axial movement clamps the media hub against bottom shell half 11 in the position shown in FIG. 3. Mechanism 10 also includes a door spring 48 and a rotating cam spring 50, as will be described below.

Figure 4:
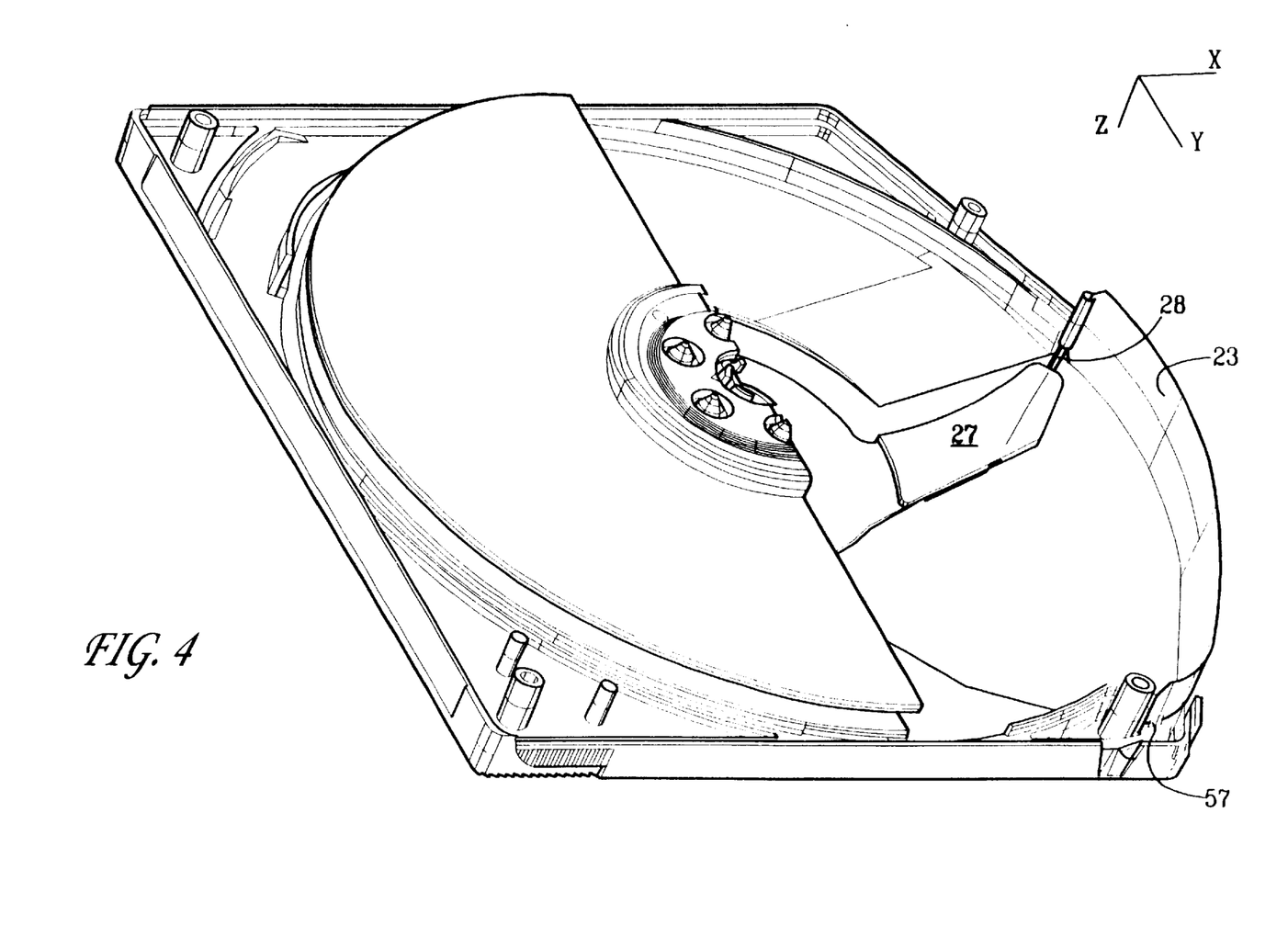
FIG. 4 is another perspective view of the embodiment shown in FIG. 3 showing.

As shown in FIG. 4, door arm 27 is connected to the door 23 by a bent wire 28. Wire 28 is slidably coupled to arm 27 to allow relative changes in the distance between door arm 27 and the end of door 23 as the door travels through its stroke, which enables clamping mechanism 10 to be employed with a door having a non-uniform radius.

Figure 5:
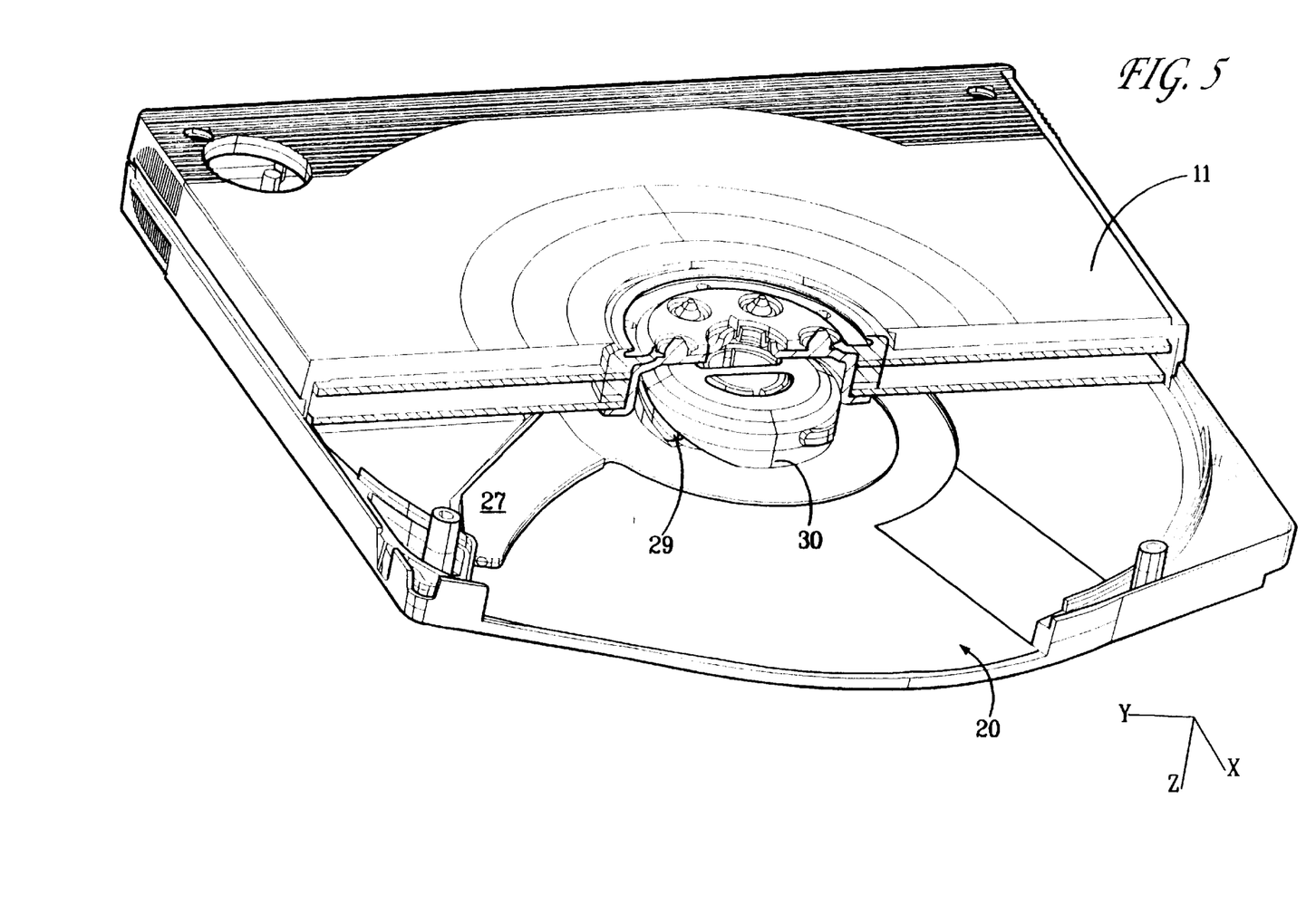
FIG. 5 is the view of the embodiment shown in FIG. 3 with the door removed for clarity.

As shown in FIG. 5, when the door 23 is moved to the open position, the door arm 27 and rotating cam 29 have been rotated counter clockwise, the translating cam 30 is fully retracted away from the media hub, and the media hub has moved away from the bottom half shell 11, by the rotation of lobes 44 within slots 46. The terms "clockwise" and "counter clockwise" as used herein are used relative to the particular Figure to which the discussion pertains.

Figure 6:
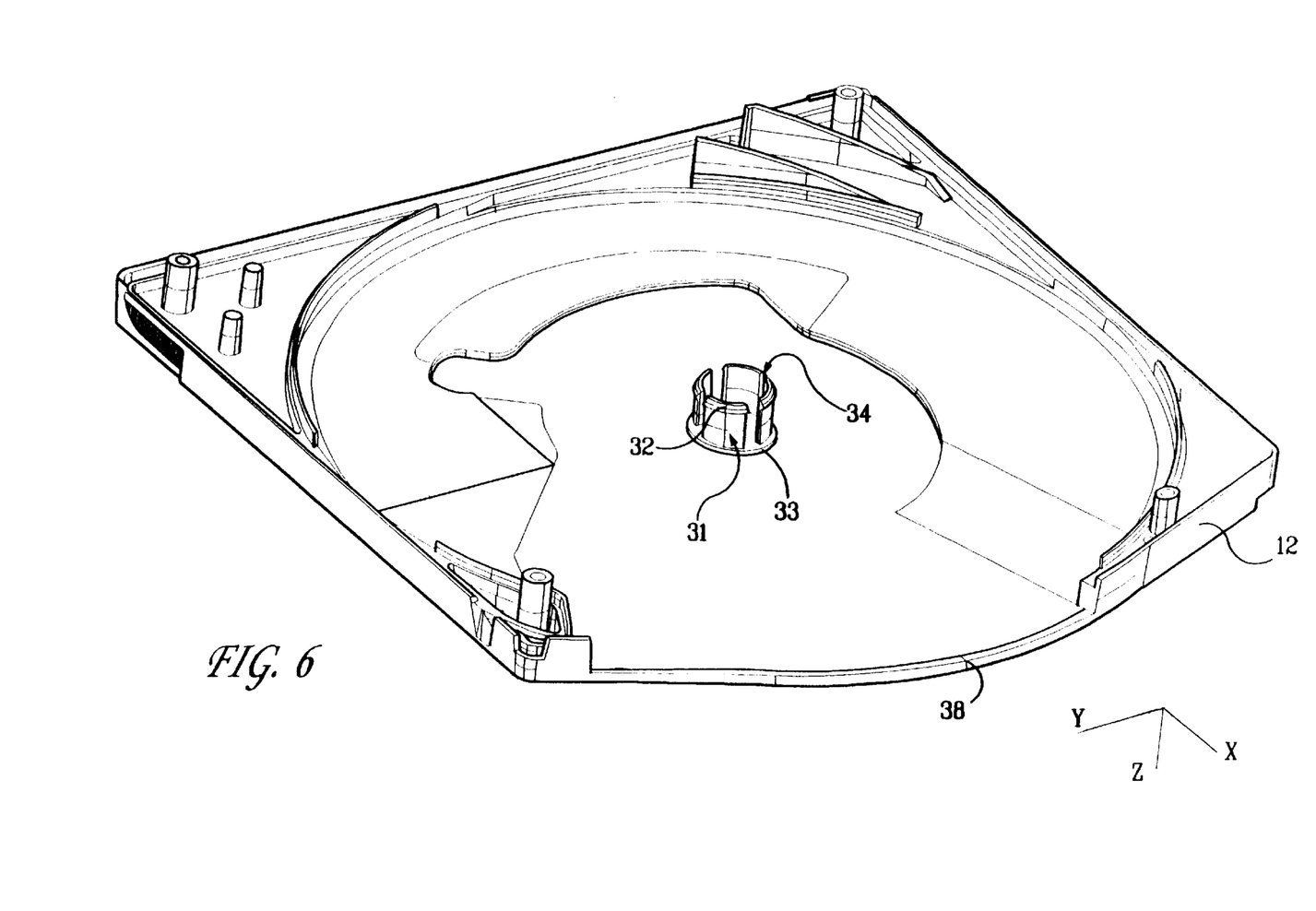
FIG. 6 is a perspective view of the top section of the cartridge with the bottom section and clamping mechanism removed.
Figure 7:
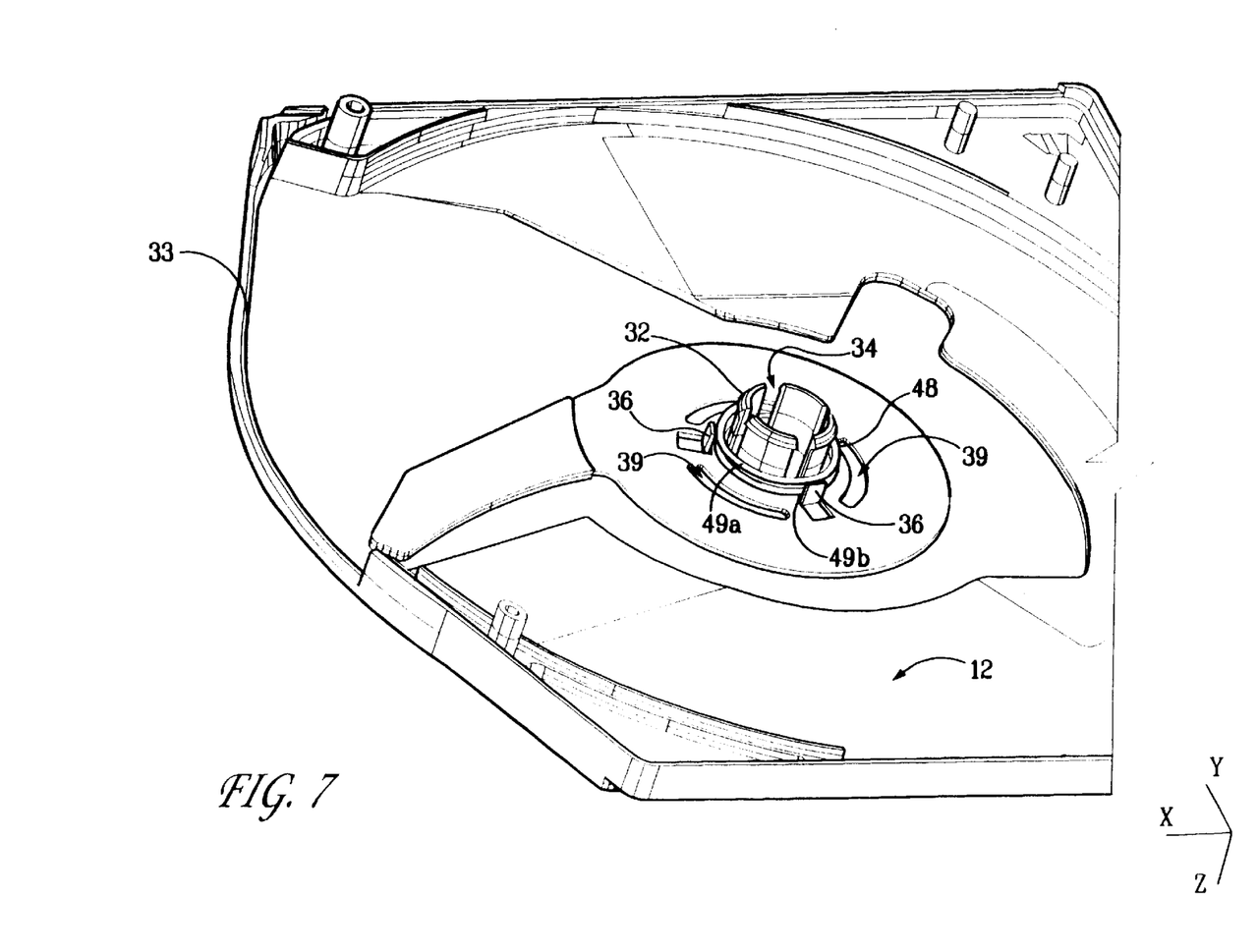
FIG. 7 is a perspective view of the top shell including the mounting post and door spring.

FIGS. 6 and 7 show the top shell half 12 with an integral mounting post 31 on which mechanism 10 mounts. The hollow mounting post 31 is substantially coaxial to the media hub. Post 31 has flexible fingers formed by notches 34 in the post. Raised lips 32 on top of the post provide "snap" retention of the rotating cam 29. A ring 33 coaxial to the media hub provides a rotating pivot surface for the door arm 27.

Figure 8:
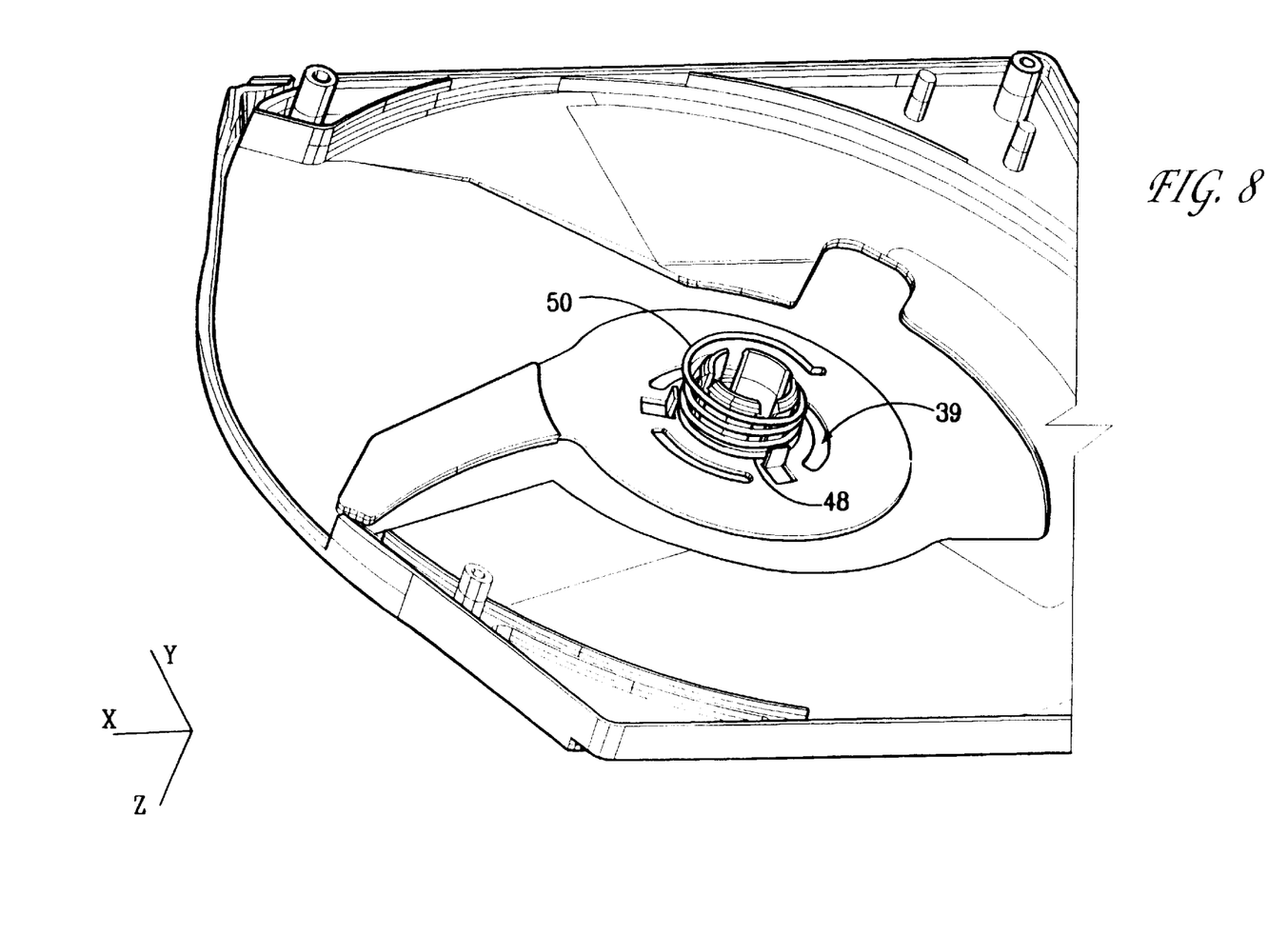
FIG. 8 shows the view of FIG. 7 with the rotating cam spring attached.
Figure 9:
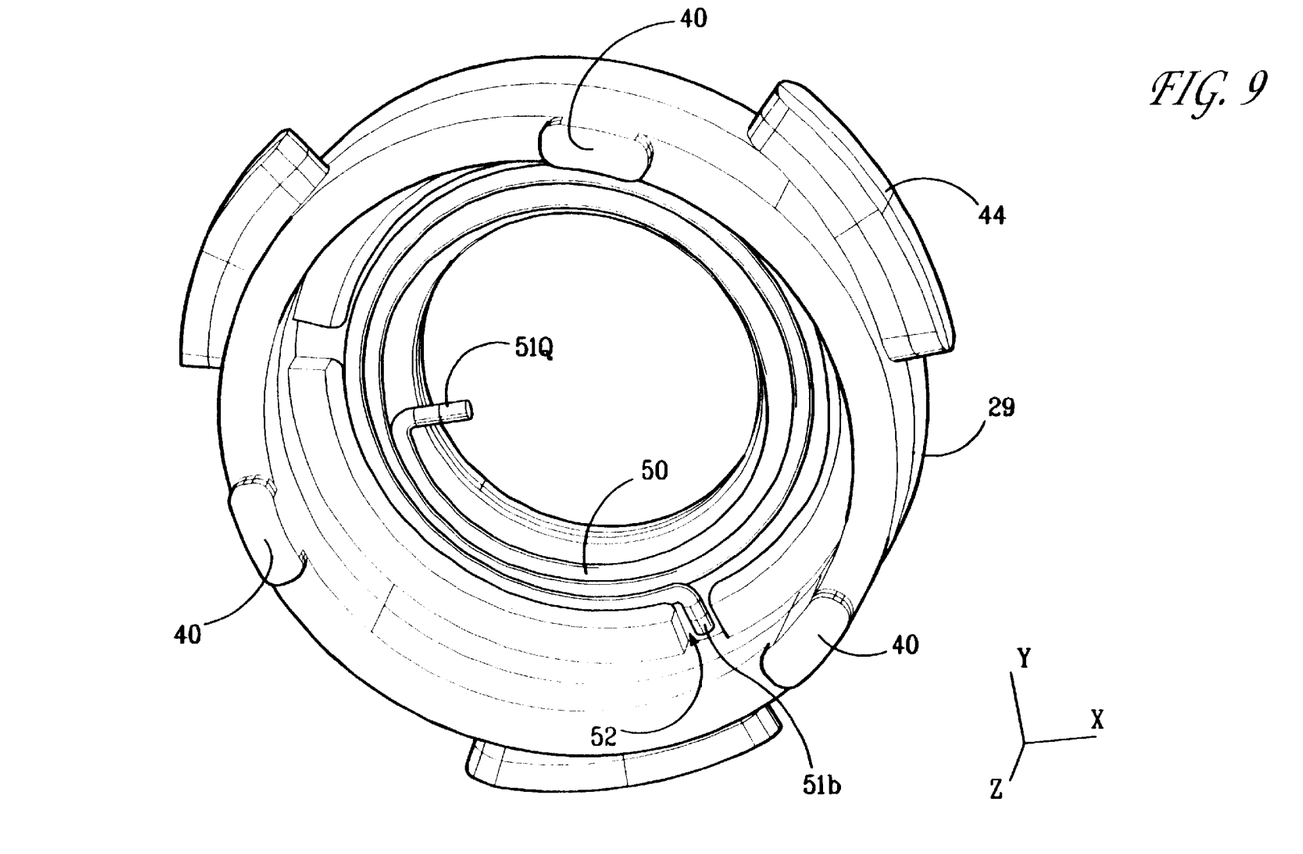
FIG. 9 shows the underside of the rotating cam with the rotating cam spring installed.

As shown in FIGS. 7 and 8, a door spring 48 and a rotating cam spring 50, each of the torsion spring-type, and disposed around post 31. Door spring 48 has one end 49a engaged in a notch 34. Another end 49b of door spring 48 is engaged on a tang 36 to provide torsion to urge arm 27 towards its closed position. Tang 36 is formed integral with door arm 27. Cam spring 50 has one end 51a engaged in another notch 34 (opposite the notch in which the door spring end 49a is engaged). Another end 51b of cam spring 50 is engaged in a notch 52 disposed on the underside of rotating cam 29, as shown in FIG. 9. Cam spring 50 urges rotating cam 29 towards its rest position corresponding to the mechanism in the locked position. FIG. 7 shows cam spring 50 removed for clarity.

The wind direction of the torsion door spring 48 is such that it urges the door arm counter-clockwise toward the closed position. As shown in FIG. 9, rotating cam 29 has feet 40 disposed on the bottom thereof that slide inside slots 39 integrally formed in the plate that forms door arm 27 (as shown in FIG. 9). Slots 39 are approximately coaxial with the disk hub, and allow feet 40 on the bottom of rotating cam 29 to extend therethrough and contact the inside surface of the top shell half 12. Slots 39 allow the rotating cam 29 to clamp the media hub while still allowing the door arm to rotate and close the door.

FIG. 10 shows the rotating cam 29 "snapped" into place over the lips 32 on the mounting post 31. The rotating cam 29 is retained and guided radially at the top by mounting post 31 and at the bottom by the slots 39 in the door arm 27.

Figure 11:
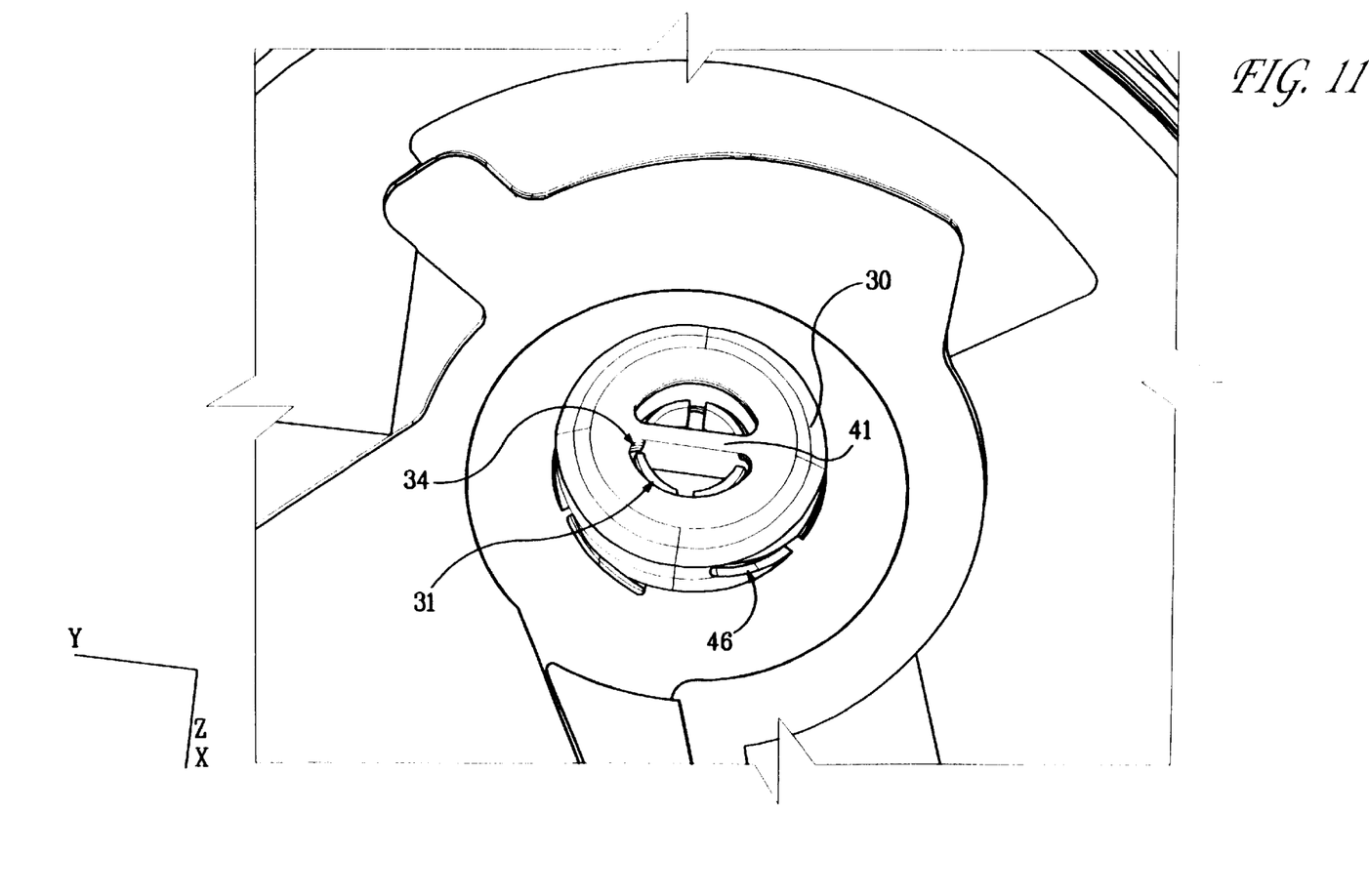
FIG. 11 is a top view of the translating cam in the raised position.

FIG. 11 shows the translating cam 30 assembled on rotating cam 29, in the raised or "door closed" position. The cross bar 41 of the translating cam 30 engages the notches 34 in the mounting post 31 to prevent rotation of the translating cam 30.

Figure 12A:
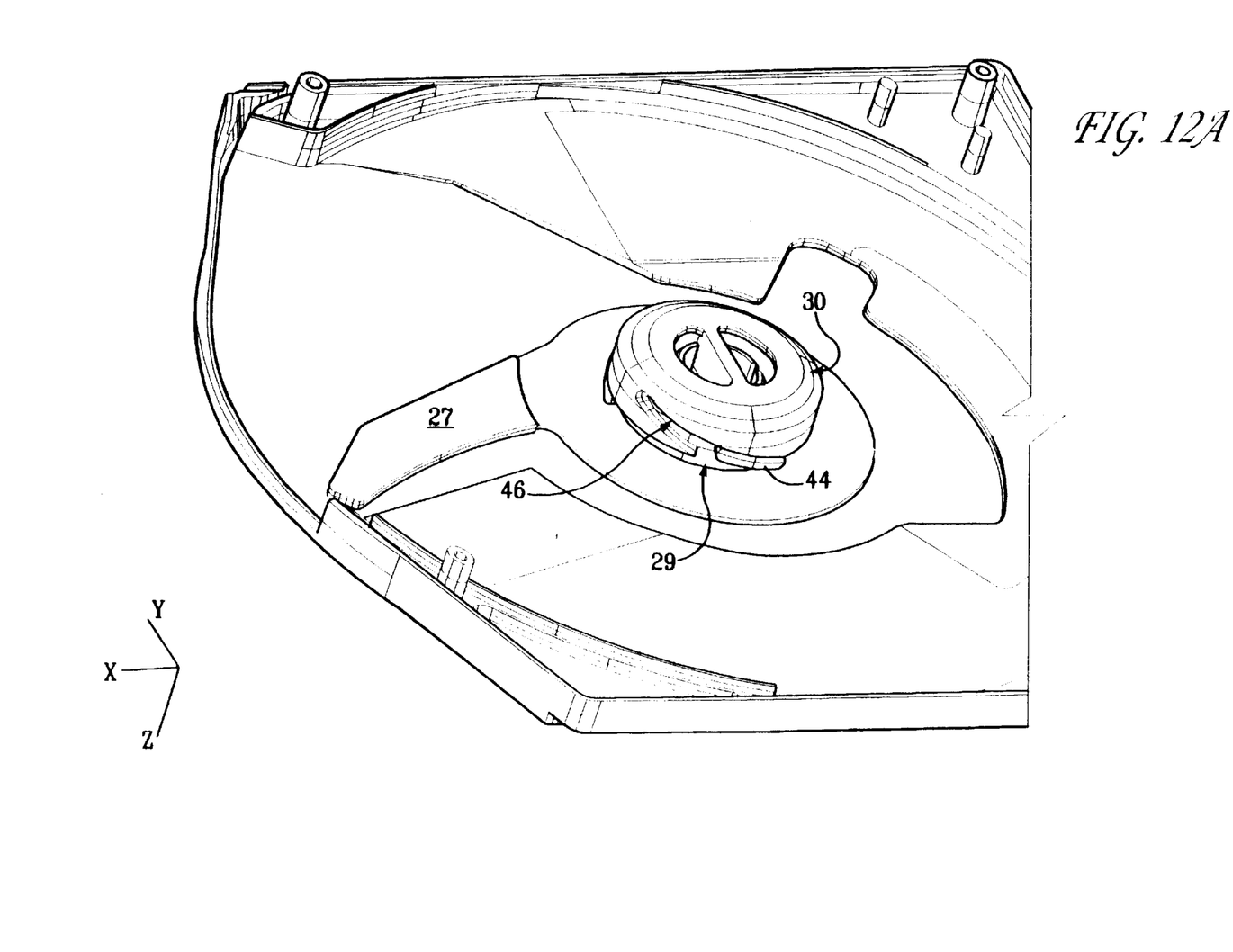
FIGS. 12A and 12B show the clamping mechanism in the locked, and unlocked positions, respectively.
Figure 12B:
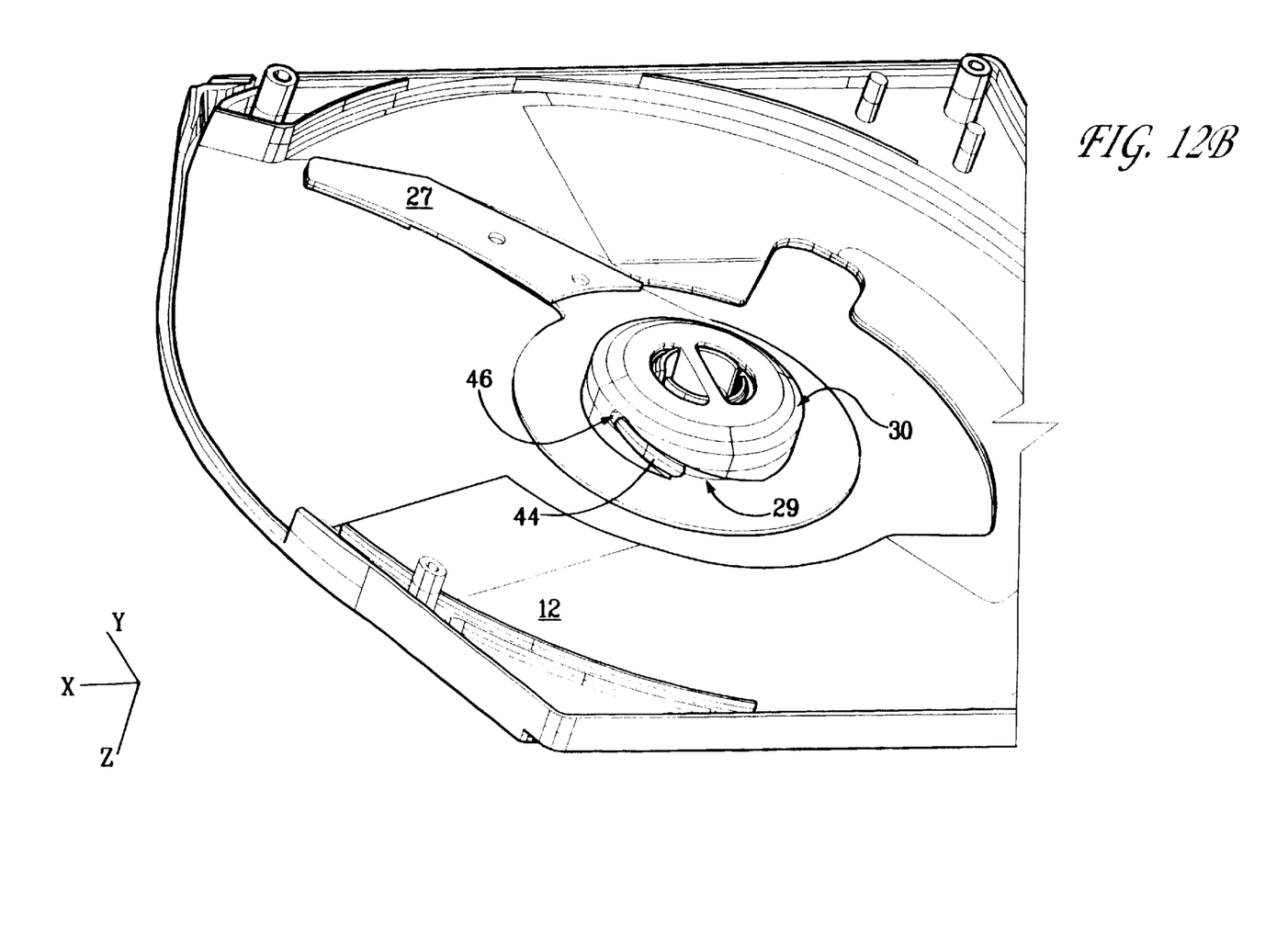

Referring to FIGS. 12A and 12B, the operation of the mechanism according to the present invention will be described. FIG. 12A shows door arm 27 in its fully closed position. Lobes 44 of rotating earn 29 (biased by spring 50) are shown urging translating cam 30 upwards (relative to FIG. 12A) to the clamped state. The fully closed position of arm 27 results in translating cam 30 urging against the disk hub to clamp the disk hub to the cartridge housing 11, as will be understood by those familiar with such cartridges. The disk hub and recording media are not shown in FIGS. 12A and 12B for clarity.

When the cartridge is inserted into a drive (not shown), a snag (not shown) disposed within the drive opens door 23 by catching on clip 57 (shown in FIG. 3) in a clockwise direction relative to FIGS. 3, 12a, and 12b. Motion of door 23 imparts rotation through wire 28 and arm 27 to pivot rotating cam 29. FIG. 12B shows arm 27 in its fully open position. Rotating cam 29 has, therefore, been rotated clockwise such that lobes 44 engage slots 46 in translating cam 30. The spiral arrangement of lobes 44 and slots 46 cause such clockwise rotation to draw translating member 30 toward rotating member 29 and top plate 12, thereby freeing the disk hub (not shown in FIG. 12B) from the mechanism to enable the recording media to rotate. When use of the disk is no longer required, the door 23 may close by the torsion created by door spring 48. Rotating cam spring 50 provides torsion to counter-clockwise pivot rotating cam 29 to its rest position that corresponds to a locked state.

The present invention may be embodied in other specific forms without departing from the spirit or essential attributes thereof and, accordingly, reference should be made to the appended claims, rather than to the foregoing specification, as indicating the scope of the invention.

What is claimed is:

1. A cartridge for a drive in which read/write heads read/record data on a recording medium, comprising:

a shell having a front, a back, two substantially flat planar surfaces coupled to each one of the front and the back, and two sides coupled to each one of the planar surfaces;

said recording medium disposed in said shell, said recording medium having a hub, said hub having a cavity proximate a center of the hub;

said shell having an opening in the front thereof for access by the read/write heads from outside of said shell to said recording medium;

a door covering said opening when said cartridge is removed from said drive, said door having an open position and a closed position;

a rotating cam, disposed within said cavity, rotatable on the same axis as the recording medium, said rotating cam having plural lobes disposed thereon;

a translating cam having slots disposed therein for cooperating with said lobes each one of said slots forming an upper slot surface and an opposing slot lower surface, said lobe urging against the slot upper surface to urge the translating cam upwardly and urging against the slot lower surface to urge the translating cam downwardly, said translating cam clamping said recording medium against one of the planar surfaces while the door is in the closed position; and a rotating cam spring positioned co-axial with said hub, said rotating cam spring applying bias to said rotating cam, said rotating cam being disposed in said cavity.

2. The cartridge of claim 1 further comprising a door spring positioned co-axial with said hub, said door spring applying bias to said door.

3. The cartridge of claim 1 wherein said lobes are spirally disposed and said slots are spirally disposed.

4. The cartridge recited in claim 3 wherein each one of said plural lobes has an arcuate length that is greater than an axial height of said plural lobes.

5. The cartridge recited in claim 3 wherein said plural lobes comprise three lobes.

6. The cartridge recited in claim 1 wherein said rotating cam is coupled to said door to pivot said rotating cam as said door is moved between the open and closed position.

7. The cartridge recited in claim 6 further comprising a wire coupled between said door and said rotating cam.

8. The cartridge recited in claim 1 further comprising an arm, coupled to said rotating cam, extending radially toward said door, a distal end of said arm being coupled to said door.

9. The cartridge recited in claim 8 wherein said door has a stroke between the open and the closed positions thereof, a wire connecting the distal end of said arm to said door, said wire being disposed in an opening in the distal end of said arm, said wire telescoping into and out of said opening as said door opens and closes to allow for over-travel at both ends of said stroke of said door.

10. The cartridge of claim 9 wherein said door slides in tracks formed in the cartridge shell.

11. The cartridge of claim 1 wherein said lobe lower surface opposes said lobe upper surface, and said slot upper surface opposes said slot lower surface.

12. The cartridge of claim 11 wherein said lobe lower surface and said slot upper surface are substantially spiral relative to said axis, and said lobe upper surface and said slot lower surface are spiral relative to said axis.

13. The cartridge of claim 11 wherein said each one of said lobe upper surface, said lobe lower surface, said slot upper surface, and said slot lower surface are spiral relative to said axis, said translating cam moving in response to urging of said lobes.

14. The cartridge of claim 1 wherein said translating cam moves in response to urging only by said rotating cam.

15. The cartridge of claim 14 wherein said translating cam is not in contact with any spring.

16. A cartridge for a drive in which read/write heads read/record data on a recording medium, comprising:

a shell having a front, a back, two substantially flat planar surfaces coupled to each one of the front and the back, and two sides coupled to each one of the planar surfaces;

said recording medium disposed in said shell, said recording medium having a hub, said hub having a cavity proximate a center of the hub;

said shell having an opening in the front thereof for access by the read/write heads from outside of said shell to said recording medium;

a door covering said opening when said cartridge is removed from said drive, said door having an open position and a closed position;

a rotating member, disposed within said cavity, rotatable on substantially the same axis as the recording medium;

an integral mounting post located coaxial to said media hub, said post having radial notches that form flexible fingers that accept said rotating member;

a translating member operatively coupled to the rotating member such that said translating member translates outwardly and inwardly relative to said mounting post in response to pivoting of said rotating member, whereby said translating member clamps said recording medium against one of the planar surfaces while the door is in the closed position; and a rotating member spring positioned co-axial with said hub, said rotating member spring applying bias to said rotating member, said rotating member being disposed in said cavity.

17. The cartridge recited in claim 16 further comprising a door spring applying bias to said door and an arm substantially radially extending between said rotating cam and said door, said door spring having one end engaging one of the notches of said mounting post and another end coupled to said arm.

18. The cartridge recited in claim 17 wherein said rotating member spring has one end engaging another one of the notches of said mounting post and another end engaging said rotating member.

19. The cartridge of claim 16 further comprising a lip, disposed on the upper surface of said post, for receiving said rotating member.

20. A cartridge for a drive in which read/write heads read/record data on a recording medium comprising:

a shell having a front, a back, two substantially flat planar surfaces coupled to each one of the front and the back, and two sides coupled to each one of the planar surfaces;

said recording medium disposed in said shell, said medium having a hub, said hub having a cavity proximate a center of the hub;

said shell having an opening in the front thereof for access by the read/write heads from outside of said shell to said recording medium;

a door covering said opening when said cartridge is removed from said drive, said door retracting from said opening in response to said cartridge being inserted in the drive;

a rotating cam rotatable on the same axis as said recording medium, said rotating cam having a spiral lobe, said cam being rotated as said door is opened and closed; and a translating cam translatable along the same axis on which the recording medium is disposed, said translating cam having a spiral slot for receiving said spiral lobe while said cartridge is removed from the drive, each one of said slots forming an upper slot surface and an opposing slot surface, said lobe urging against the slot upper surface to urge the translating cam upwardly and urging against the slot lower surface to urge the translating cam downwardly, a member rotatable about the axis of said recording medium, said rotating cam being connected to said door by said member, said member having an arm extending radially toward said door, a distal end of said arm being connected to said door; and a wire connecting the distal end of said arm to said door, said wire being disposed in an opening in the distal end of said arm, said wire telescoping into and out of said opening as said door opens and closes to allow for over-travel when the door is in an open position and in a retracted position.

21. The cartridge of claim 15 further comprising a rotating cam spring applying bias to said rotating cam.

22. The cartridge of claim 21 wherein said hub forms a cavity therein.

23. The cartridge of claim 22 wherein said rotating cam is at least partially disposed within said cavity.

24. The cartridge of claim 23 wherein said rotating cam spring is disposed within a hollow formed within said rotating cam.

25. The cartridge of claim 24 wherein said rotating cam hollow is opposite said hub cavity.

* * * * *